[11] 3,625,588

| | | | |
|---|---|---|---|
| [72] | Inventor | Pierre Malifaud<br>Paris, France | |
| [21] | Appl. No. | 832,763 | |
| [22] | Filed | June 12, 1969 | |
| [45] | Patented | Dec. 7, 1971 | |
| [73] | Assignee | Angence Nationale de Valorisation de la Recherche (Anvar)<br>Puteaux, France | |
| [32] | Priority | June 12, 1968 | |
| [33] | | France | |
| [31] | | 154666 | |

[54] MAXIMUM ILLUMINATION OPTICAL CONCENTRATOR
3 Claims, 3 Drawing Figs.

[52] U.S. Cl. ................................................. 350/96 B, 350/227
[51] Int. Cl. ................................................. G02b 5/16
[50] Field of Search ...................................... 350/96; 250/227

[56] References Cited
UNITED STATES PATENTS

| | | | |
|---|---|---|---|
| 3,187,627 | 6/1965 | Kapany ................... | 350/96 (B) X |
| 3,413,468 | 11/1968 | Astheimer ............... | 350/96 UX |
| 3,467,840 | 9/1969 | Weiner .................... | 350/96 UX |

FOREIGN PATENTS

| | | | |
|---|---|---|---|
| 1,110,821 | 4/1968 | Great Britain ........... | 350/96 |

*Primary Examiner*—John K. Corbin
*Attorney*—Bacon & Thomas

ABSTRACT: The present invention relates to an optical concentrator with maximum illumination, comprising a frontal parabolic mirror with half opening $\theta_1$ (angle made by a straight line connecting the focus and the mirror edge with reference to the optical axis) effecting a first concentration of a flux captured from a distant source of radiation, forming an image in the smallest section of a bundle of convergent rays with half angle opening $\theta_1$ with the optical axis, and a truncated cone mirror whose entrance section of diameter $d_1$ is disposed to coincide with the so-called Gaussian image furnished by the said frontal parabolic mirror, and whose terminal section, of smaller diameter, is associated with a sensitive element or radiation transformer of a receiver.

Fig. 2
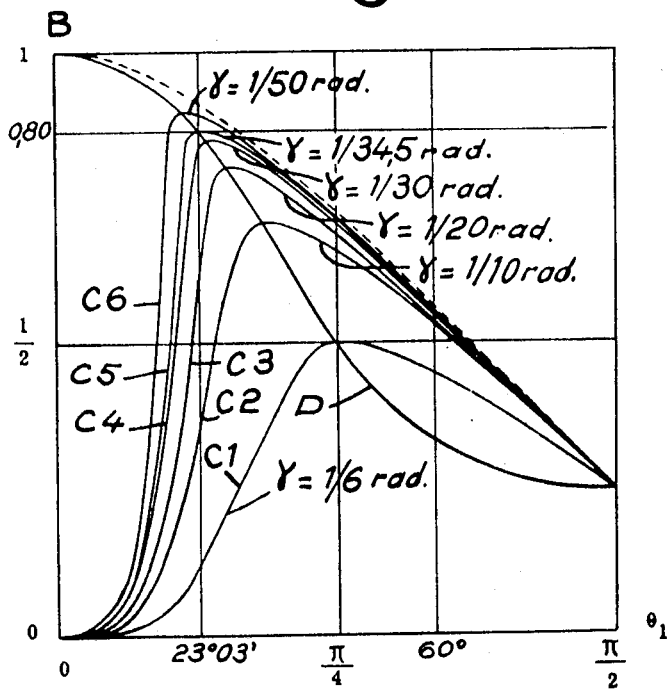
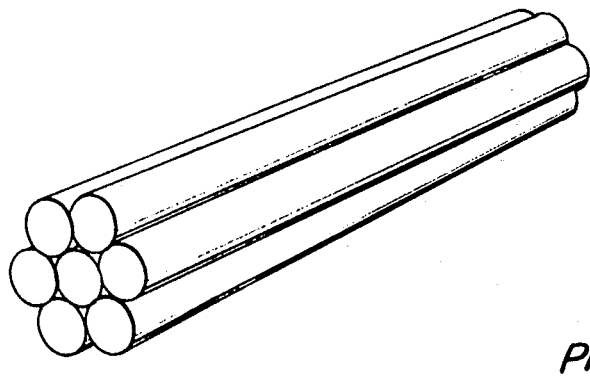
Fig. 3

MAXIMUM ILLUMINATION OPTICAL CONCENTRATOR

BACKGROUND OF THE INVENTION

In such a device, only the Gaussian image furnished by the frontal parabolic mirror is used. That is to say, only the central part of the total image is used in a circle having the same diameter as the image, which would be furnished by an aplanatic optical concentrator system (satisfying the Abbe sinus condition) having the same diameter of entrance and the same focal as the present frontal parabolic mirror. Thus the part of the image is used in which the illumination is greatest. The energy encircled in this Gaussian image is thus taken up by means of a truncated cone mirror associated with the device, furnishing supplementary concentration. But until the present, concrete embodiments have been disappointing. This derives from the fact that associations of this kind between a parabolic mirror and a truncated cone mirror have been designed empirically. A parabolic mirror is provided which is very open, with half opening $\theta_1$ equal for example to 60°, associated with a truncated cone mirror with apex angle relatively wide (more than one-tenth radian for the apex half angle). In these conditions, two drawbacks occur. First, the energy enclosed in the Gaussian image constitutes only a part of the total captured energy, in a proportion fixed by the expression $$\cos^4 \frac{\theta_1}{2}.$$

For $\theta_1$ 60°, for example, this proportion is only 56 percent representing a flux loss of 44 percent. Finally, the associated truncated cone mirror which has a relatively wide half angle at the apex and which is not itself optimized is incapable of effecting a supplementary concentration of radiation sufficient to attain or even approach the limit maximum illumination in its terminal section. The results are mediocre, and in no case is the proportion of flux that is conserved predetermined.

SUMMARY OF THE INVENTION

The present invention is intended to alleviate these various disadvantages, allowing the attainment of maximum limit illumination, preserving a predetermined proportion of the captured radiation flux.

To effect this, it relates to an optical concentrator of the above mentioned type, characterized in that the half angle of opening $\theta_1$ of the frontal parabolic mirror, the half angle at the apex $\gamma$ and diameter $d_3$ of the terminal section of the truncated cone mirror are determined by the dimensioning equations below:

$$\frac{1}{4}\left(\frac{1+\cos\theta_1}{\cos\theta_1+\sin^2\theta_1}\right)^2 = B \quad (1)$$

$$tg\gamma = \frac{\sin\theta_1(1-\cos\theta_1)}{\cos\theta_1+\sin^2\theta_1} \quad (2)$$

$$\frac{d_1}{d_3} = \frac{\cos\gamma}{\sin(\theta_1-\gamma)} \quad (3)$$

B being a predetermined value of the ratio between the flux collected in the terminal section of the truncated cone mirror and the flux captured by the parabolic mirror.

In this way, for a radiation source of given apparent diameter, assumed to be distant, and for a given diameter of entrance pupil of the device (i.e., for a given diameter of the parabolic mirror) and with predetermined ratio B, it is possible unequivocally to determine in a single optimal combination the half angle of opening $\theta_1$ of the frontal parabolic mirror and the dimensions of the truncated cone mirror to allow maximum limit illumination with preservation of the predetermined proportion of the flux.

In practice, the value of the half angle of opening $\theta_1$ determined by means of the dimensioning equations above is in the range between about 15° and 45°. The value of the half angle at the apex $\gamma$ of the truncated cone mirror is between one-sixtieth and one-tenth radians. For each case, a single pair of these values in determined.

The object of the present invention will be still better understood through the following description of a nonlimitative embodiment and with reference to the attached drawing in which:

BRIEF DESCRIPTION OF THE DRAWINGS

FIG. 2 shows a graph illustrating the variations of ratio B as a function of the half angle of opening $\theta_1$, of the frontal parabolic mirror and for various values of the half angle to the apex $\gamma$ of the associated truncated cone mirror; and FIG. 3 is a perspective view of a bundle of truncated cone mirrors constituted by truncated optical fibers.

DESCRIPTION OF A PREFERRED EMBODIMENT

Figure 1:
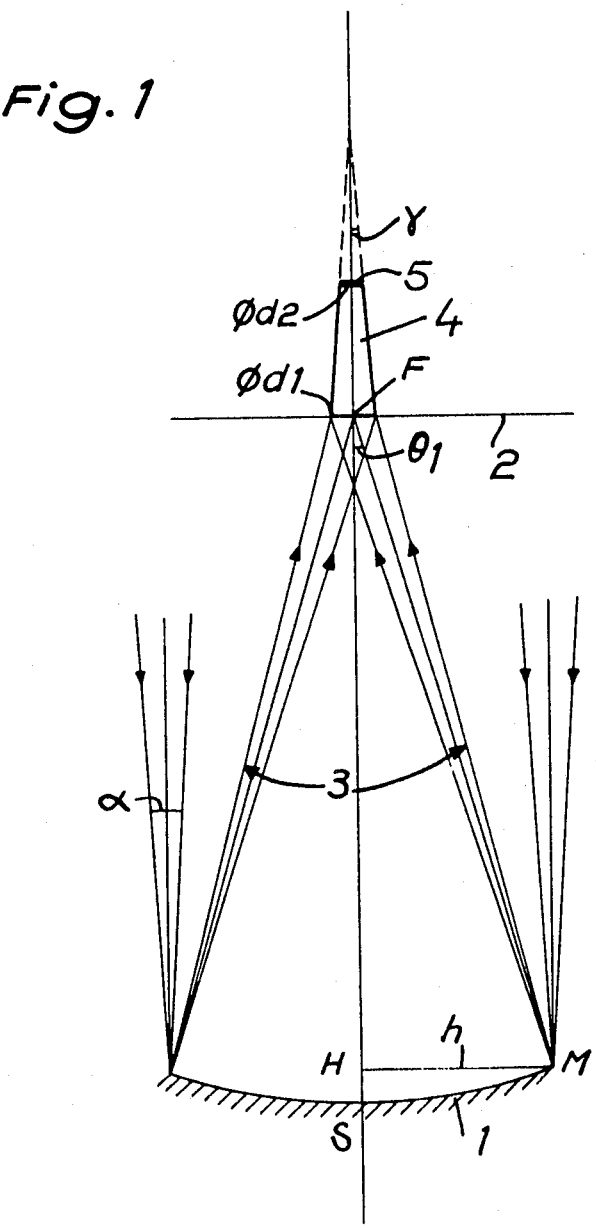
FIG. 1 shows an optical schema of the device of the invention.

In FIG. 1 an optical concentrator is seen which comprises in combination on the one hand a frontal parabolic mirror 1 with vertex S and focus F, whose entrance pupil of radius MH captures a flux emanating from a distant source of radiation that is not illustrated, of apparent diameter $\alpha$, the said parabolic mirror forming an image of the source in its focal plane 2 by means of a convergent bundle of rays 3, having a half angle (average) of opening $\theta_1$ determined according to the invention, and on the other hand a truncated cone mirror 4 whose entrance section of diameter $d_1$ is disposed in the plane of image 2 in coincidence with the surface of the so-called Gaussian image, the said truncated cone mirror having a half angle at apex $\gamma$ and terminal section of diameter $d_3$ determined according to the invention and associated with the sensitive element or radiation transformer 5 of a receiver.

If a value B of the proportion of flux to be conserved is fixed while the limit maximum illumination is attained in terminal section $d_3$ of the truncated cone mirror, and if moreover the diameter of the entrance pupil of the parabolic mirror and the apparent diameter $\alpha$ of the radiation source are known, it is possible according to the invention to determine unequivocally, in unique optimal combination, the half opening $\theta_1$ of parabolic mirror and the dimensions characterizing truncated cone mirror 4 by means of the following equations:

$$\frac{1}{4}\left(\frac{1+\cos\theta_1}{\cos\theta_1+\sin^2\theta_1}\right)^2 = B \quad (1)$$

$$tg\gamma = \frac{\sin\theta_1(1-\cos\theta_1)}{\cos\theta_1+\sin^2\theta_1} \quad (2)$$

$$\frac{d_1}{d_3} = \frac{\cos\gamma}{\sin(\theta_1-\gamma)} \quad (3)$$

The diameter $d_1$ of the so-called Gaussian image furnished by the frontal parabolic mirror 1 is given by the known equation below, designating by $\alpha$ the apparent diameter of the radiation source which is assumed to be distant, and by $h$ the radius MH (see FIG. 1) of the entrance pupil of the parabolic mirror:

$$d_1 = \frac{h}{2tg\frac{\theta_1}{2}} \cdot tg\alpha \quad (5)$$

The following numerical example shows the manner of determining the half angle of opening $\theta_1$ and of constructing the truncated cone mirror 4 is a specific case.

We assume a source of radiation, rather distant, of apparent diameter $\alpha=5°$; $tg\alpha=0.0875$. The diameter $2h$ of the entrance section of frontal parabolic mirror 1 is for example 50 mm. We assume that 0.80 is set as predetermined value of ratio B.

Equation (1) yields the optimal value of $\theta_1$:

$$\theta_1 = 23°03'$$

Equation (2) gives the optimal value of $\gamma$:
$\gamma = 0.029$ radian $= 1/34.5$ radian By applying equation (5) we have $d_1 = 5.36$ mm. And applying equation (3), we find
$$d_1/d_3 = 2.74$$
whence
$$d_3 = 1.96 \text{ mm.}$$

The length L of the truncated cone mirror is equal to $(5.36-1.96)2\gamma$, or
$$L = 58.65 \text{ mm.}$$

The average number $\overline{P}$ of internal relfections in the truncated cone mirror can be computed by means of the equation:

$$\overline{P} = 0.64 \frac{\frac{\pi}{2} - \theta_1}{2} \quad (6)$$

We find here an average of thirteen reflections.

It is understood with reference to the graph of FIG. 2 why this optical concentrator thus dimensioned is optimal. The values of the half angle of opening $\theta_1$ of the frontal parabolic mirror are plotted as abscissas, and the values of ratio B are plotted in ordinates (ratio between the flux collected in the terminal section of the truncated cone mirror and the flux captured by the frontal parabolic mirror) with $\gamma$ constant for a certain number of values of the half angle at the apex $\gamma$ of the truncated cone mirror. It is to be seen that each curve with constant $\gamma$ such as $C_1, C_2, C_3... C_n$ presents a characteristic giving at B a maximum value for a specific value pair for $\theta_1$ and $\gamma$. The location of these crests is curve D, showing maximum values of B as a function of $\theta_1$ according to equation (1):

$$B_{max} = \frac{1}{4} \cdot \left( \frac{1 + \cos \theta_1}{\cos \theta_1 + \sin^2 \theta_1} \right)^2$$

It is to be seen, for example, that ratio B attains the value of 0.08 for the optimal pair of values: 23° 03' for $\theta_1$ and 1/34.5 radian for $\gamma$. This pair of values is optimal in the sense that the half angle at the apex $\gamma$ of the truncated cone mirror is thus the widest possible, which is advantageous (shorter truncated cone mirror, lower number of internal reflections). It is to be noted, in following the horizontal line B 0.80, that in adopting values for $\theta_1$ that differ from 23° 03', angles $\gamma$ smaller than 1/34.5 radian are taken.

It is possible to inquire what latitude there is in the choice of $\theta_1$. There can be a variation of several degrees without too much change of the value of $\gamma$, which is advantageous for manufacturing tolerances, but then the values of $\gamma$ increase rapidly and we go entirely beyond the zone of optimization.

In the above example, since the predetermined value of ratio B remains at 0.80 it is possible to vary $\theta_1$ and calculate the corresponding value of $\gamma$. The general equation that allows this calculation is the following:

$$B = \cos^4 \frac{\theta_1}{2} \cdot \frac{(\sin \theta_1 - tg\gamma \cos \theta_1)^2}{\sin^2 \theta_1} \quad (7)$$

For $\theta_1 = 25°$ instead of 23° 01' we find $\gamma = 1/35$ radian instead of 1/34.5 radians, which is very little different.

For $\theta_1 = 30°$ we find $\gamma 1/56$ radian, and the average number of internal reflections $\overline{P}$ goes to 19. We are at the limit of the optimal zone.

For $\theta_1 = 35°$ we find $\gamma = 1/86$ radian and the average number of internal reflections $\overline{P}$ reaches 26. The conditions are no longer optimal at all.

The limit value for $\theta_1$ is 37° 56' for which $\gamma = 0$. The truncated cone mirror becomes infinitely long and the number of reflections also becomes infinite. For values of $\theta_1$ greater than 37° 56' there is no longer any solution, i.e., it is impossible to construct a truncated cone mirror capable of furnishing an illumination that attains the maximum limit with preservation of 80 percent of the flux, in combination with the frontal parabolic mirror.

Now we have seen that in prior designs high values were assigned to the half angle of opening $\theta_1$ of the frontal parabolic mirror. For $\theta_1 = 60°$, a conventional value for solar energy concentrators, for example, ratio B can hardly exceed 0.50, no matter what value may be assigned to the half angle at the apex $\gamma$ of the associated truncated cone mirror. This condition exists, assuming that the truncated cone mirror is optimized according to equation (3) mentioned above. Since this is not the case for empirical associations previously tried, ratio B has in fact a value that is always well below 0.50.

A concentrator according to the invention can associate a plurality of elementary truncated cone mirrors with a single frontal parabolic mirror, the said truncated cone mirrors being mounted in a bundle and functioning in parallel. These truncated cone mirrors can be contiguous pyramids with square or hexagonal base, for example. The advantages stemming from this modification are the following. It is possible thus to reproduce on the sensitive element of the receiver associated with the terminal section of the truncated cone mirror a mosaic image of the radiation source, or at least it is possible to localize the region of space where this source of radiation is located. Furthermore, the length of the bundle of elementary truncated cone mirrors thus formed is shorter in proportion to the square root of the number of elementary mirrors (considered in a section passing through the optical axis) than that of a single equivalent truncated cone mirror. The bundle of elementary truncated cone mirrors can be constituted by conical optical fibers, but then each of the said fibers has an optimized dimensioning according to equations (2) and (3) and is associated in optimal combination with a frontal parabolic mirror whose half angle of opening $\theta_1$ is given by equation (1). Such optimized optical conical fibers have a half angle at the apex which is much greater ($1/60 < \gamma < 1/10$ radian approximately) than that of conical optical fibers ordinarily used.

The present invention can have the most multifarious applications, especially in the field of solar energy concentrators, in infrared detection, photographic concentration etc.

I claim:

1. Optical concentrator with maximum illumination, comprising a frontal parabolic mirror half opening $\theta_1$ (angle made by a straight line joining the focus to the mirror edge and the optical axis) effecting a primary concentration of a flux captured from a distant radiation source, forming an image in the smallest section of a bundle of convergent beams with half angle of opening $\theta_1$ with the optical axis, and a truncated cone mirror whose entrance section of diameter $d_1$ is disposed in coincidence with the so-called Gaussian image furnished by the said frontal parabolic mirror and whose terminal section, of smaller diameter, is associated with a sensitive element or a radiation transformer of a receiver, the device being characterized in that the half angle of opening $\theta_1$ of the frontal parabolic mirror, the half angle at apex $\gamma$ and diameter $d_3$ of the terminal section of the truncated cone mirror are determined by the following dimensioning equations:

$$\frac{1}{4} \left( \frac{1 + \cos \theta_1}{\cos \theta_1 + \sin^2 \theta_1} \right)^2 = B \quad (1)$$

$$tg\gamma = \frac{\sin \theta_1 (1 - \cos \theta_1)}{\cos \theta_1 + \sin^2 \theta_1} \quad (2)$$

$$\frac{d_1}{d_3} = \frac{\cos \gamma}{\sin (\theta_1 - \gamma)} \quad (3)$$

B being a predetermined value of the ratio between the flux collected in the terminal section of the truncated cone mirror and the flux captured by the parabolic mirror.

2. Optical concentrator with maximum illumination as in claim 1, characterized in that the truncated cone mirror is constituted by a bundle of elementary truncated cone mirrors functioning in parallel.

3. An optical concentrator with maximum illumination as in claim 2 characterized in that each elementary truncated cone mirror is constituted by a truncated cone optical fiber whose dimensions are determined by the following dimensioning equations:

$$\frac{1}{4}\left(\frac{1+\cos\theta_1}{\cos\theta_1 - \sin^2\theta_1}\right)^2 = B \qquad (4)$$

$$tg\gamma = \frac{\sin\theta_1(1-\cos\theta_1)}{\cos\theta_1 + \sin^2\theta_1} \qquad (5)$$

$$\frac{d_1}{d_2} = \frac{\cos\gamma}{\sin(\theta_1-\gamma)} \qquad (6)$$

* * * * *